Nov. 22, 1949　　　F. G. HODSDON　　　2,488,725
MILKER RELEASER

Filed Nov. 19, 1947　　　　　　　　　　　2 Sheets-Sheet 1

INVENTOR.
Floyd G. Hodsdon
BY
Paul O. Pippel
ATTY.

Nov. 22, 1949 F. G. HODSDON 2,488,725
MILKER RELEASER
Filed Nov. 19, 1947 2 Sheets-Sheet 2
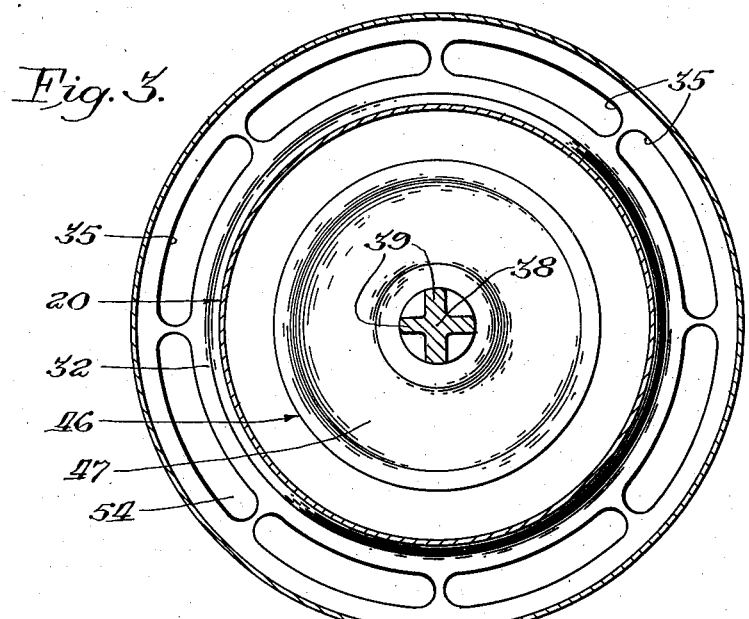
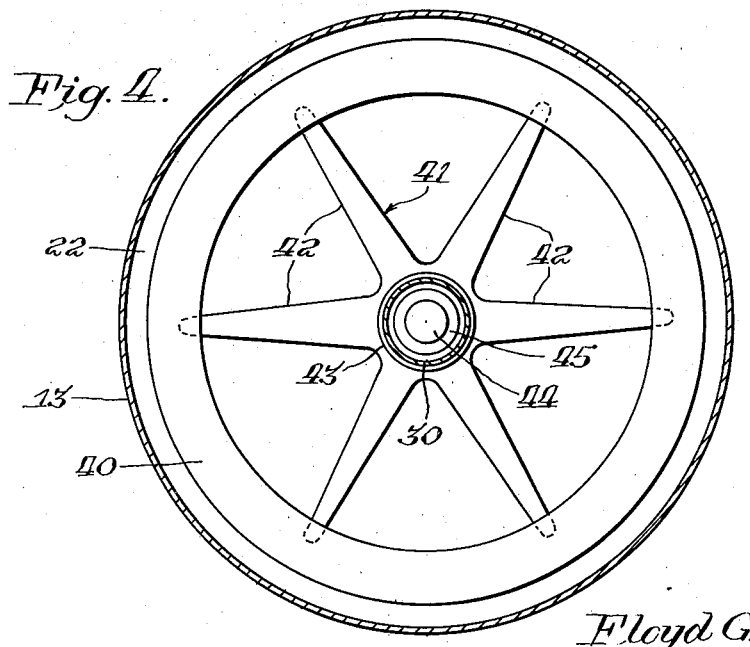
INVENTOR.
Floyd G. Hodsdon
BY Patented Nov. 22, 1949

2,488,725

UNITED STATES PATENT OFFICE 2,488,725

MILKER RELEASER

Floyd G. Hodsdon, Milwaukee, Wis., assignor to International Harvester Company, a corporation of New Jersey Application November 19, 1947, Serial No. 786,979

13 Claims. (Cl. 31—82)

This invention relates to a cow milker, and more particularly to a cow milker of the releaser type.

In modern milking systems wherein the releaser type of milker is used, the animal is milked with the conventional type of vacuum operated teat cups and the milk is then carried directly from the cow to a pipe line. The pipe line carries the milk to a milker releaser container wherein the milk is collected. After a certain quantity of milk has been collected in this manner, the milker releaser container functions to release the milk to a second pipe line leading to a bulk receiver. The releaser thus is effective to discharge milk from the system without reducing the vacuum therein. Milker releasers of this type have been found expensive to manufacture since previous constructions involved the use of numerous and complicated parts. The release of milk in the conventional above mentioned constructions was usually accomplished by sets of valves which were opened by the weight of the milk when the pressure within the receiving chamber and the discharge chamber were equalized. The gravity operation of the valves was found to be rather uncertain and undependable. It is desirable, therefore, that a releaser milker be provided which will have positive action valves that can be depended upon to efficiently and effectively release the milk. It is applicant's prime object to provide a milking machine of the releaser type having an improved valve mechanism therefor.

It is another object of applicant's invention to provide a releaser type milker having a receiving chamber, an intermediate chamber, and a discharge chamber, said chambers including an improved valve mechanism for equalizing the pressures therein and effecting release of the milk from one chamber to another.

It is another object of this invention to provide a milker releaser having an improved valve mechanism arranged to equalize the pressures within the chambers of the releaser, said valve mechanism being operated by a source of pulsating pressure.

Still another object is to provide a milker releaser having an improved valve mechanism for effecting release of the milk from the various chambers of said releaser, said valve mechanism including resilient pressure responsive valves.

Other important objects will become apparent to those skilled in the art as the disclosure is more fully made.

These desirable objects are obtained in one practicable form of the invention herein illustrated and described which embodies a container having a milk receiving, an intermediate, and a discharge chamber; the milk discharged from said receiving and intermediate chambers being controlled by valve mechanism actuated by a pulsating mechanism. The pulsating mechanism utilized can be of any conventional type and the one herein disclosed is fully shown and described in applicant's Patent #1,844,853, issued February 9, 1932.

Fig. 3 is a sectional view taken along the line 3—3 of Fig. 1.

Fig. 4 is a cross sectional view taken along the line 4—4 of Fig. 1.

Fig. 5 is a cross sectional view taken along the line 5—5 of Fig. 1.

Figure 1:
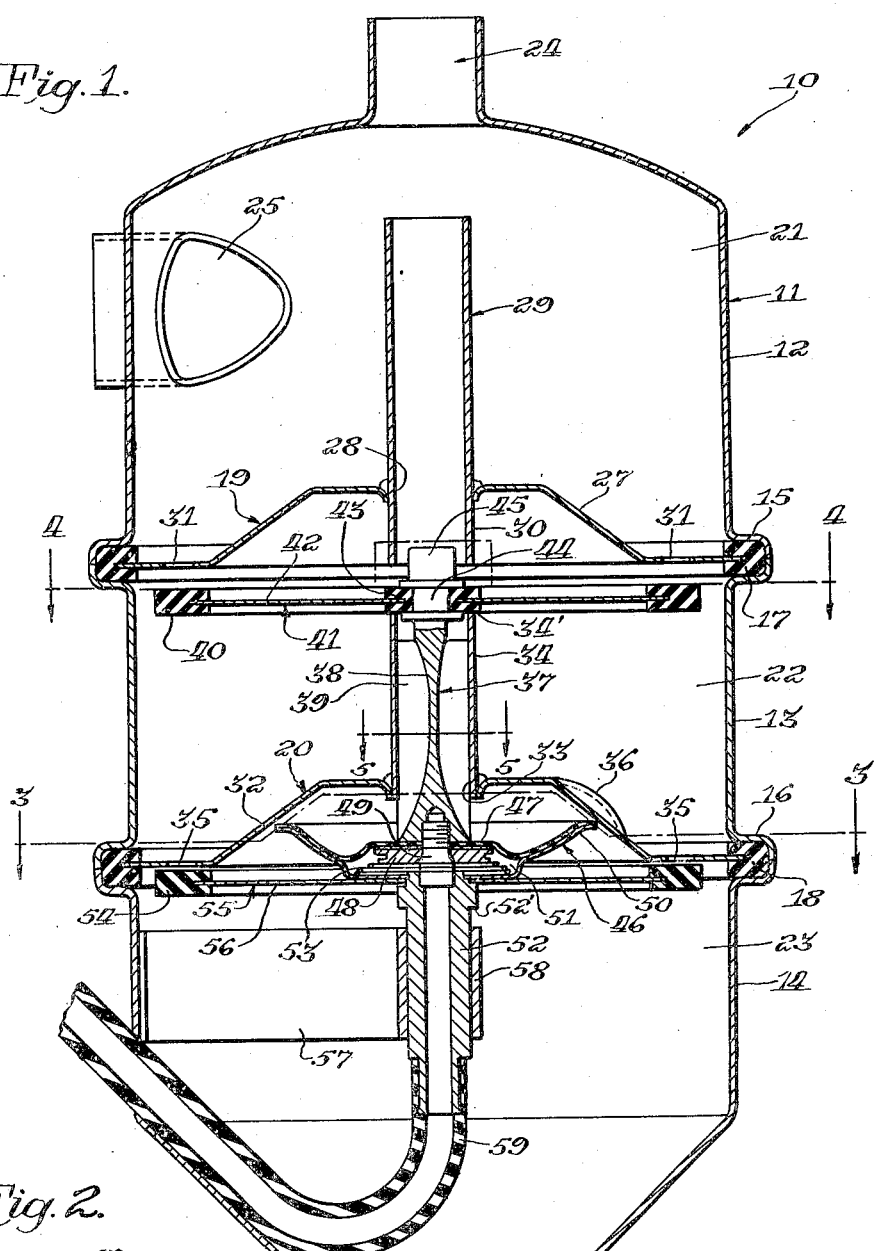
Fig. 1 is a cross sectional view in elevation through the milker releaser.

Referring particularly to Fig. 1, a milk releaser is designated by the reference character 10. The milk releaser 10 consists of a container 11 having first, second, and third cylindrical sections respectively designated 12, 13, and 14. The cylindrical sections 12, 13, and 14 are formed with cup shaped rims arranged to cooperate with one another to form circumferentially extending annular pockets 15 and 16. Annular sealing rings 17 and 18 are respectively carried in the pockets 15 and 16 for sealing the container 11. The container 11 is provided with upper and lower partition walls 19 and 20. The upper partition wall 19 forms one end of a milk receiving chamber 21 and separates said chamber from an intermediate chamber 22. The lower partition wall 20 separates said intermediate chamber 22 from a discharge chamber 23.

The milk receiving chamber 21 is continuously under vacuum pressure and is provided with a vacuum conduit 24. A milk inlet conduit 25 is formed at one side of the chamber 21. The discharge chamber 23 is formed with a downwardly extending milk outlet conduit 26.

The upper partition wall 19 is formed with a centrally disposed dished portion 27. The dished portion includes therein a central air opening 28. A vertical tube or stand pipe 29 extends through the air opening 28, said tube being provided at its lower end with an extension 30 extending downwardly below the upper partition wall 19. The vertical tube 29 extends upwardly to a height which is somewhat above the maximum fluid level within the receiving chamber 21. The upper partition wall also includes a plurality of peripherally disposed slots or milk discharge openings 31.

The lower partition wall 20 is also provided with a central dished portion 32 which extends upwardly into the intermediate chamber 22. The dished portion 32 includes a central air opening 33. A vertical tube or stand pipe 34 is in communication with the central air opening 33 and is provided at its top with a valve seat 34'. The tube 34 is in axial alignment with the tube 29 and the valve seat 34' is spaced somewhat downwardly below the end of the extension 30. As best shown in Fig. 3, the lower partition wall 20 also includes a plurality of peripherally disposed slots or milk discharge openings 35 similar to the openings 31 in the upper partition wall 19. The dished portion 32 also includes a dimpled portion 36, the purpose of which will presently become more apparent.

The valve mechanism for controlling the flow of milk through the chambers is generally referred to by the reference character 37. The valve mechanism 37 includes a slidable valve support or valve stem 38 which is arranged to vertically reciprocate within the tube 34. The valve stem 38 also includes a plurality of radially extending vanes 39 best shown in Figs. 3 and 5.

An upper annular valve ring or milk control valve 40 is positioned immediately below the upper partition wall 19. The milk control valve 40 is made of a suitable flexible sealing material and is arranged to seal the slots 31 formed in the upper partition wall 19. The valve ring 40 is resiliently supported by means of a spider 41 having a plurality of radially extending fingers 42. As best shown in Fig. 4, the fingers 42 extend radially outwardly into the valve ring 40.

Disposed near the hub of the spider 41 is a resilient valve disc or element 43 arranged to alternately seal the lower end of the tube 29 and the upper end of the tube 34. The resilient valve disc 43 and spider 41 are secured to the upper end of the valve stem 38 by means of a threaded extension 44 which extends through the hub of the spider and through the valve disc 43. A nut 45 secures the parts together.

A diaphragm structure 46 is connected to the lower end of the valve stem 38. The diaphragm structure 46 includes a diaphragm 47 made of a suitable flexible material. The diaphragm 47 is secured at its center to the valve stem 39 by means of a diaphragm plate 48 and a screw 49. The edges of the diaphragm 47 are secured to a metal diaphragm cup 50, the space between the diaphragm 47 and said cup 50 forming a diaphragm chamber 51. The diaphragm cup 50 is connected at its center portion to a tubular member 52. A conical spring 53 is carried at its lower end on the diaphragm cup 50 and has its upper end engaging the diaphragm plate 48. The function of said spring 53 is to normally force the diaphragm structure 46 into an expanded position.

A lower annular valve ring or milk control valve 54 is positioned below the lower partition wall 20. The valve ring 54 is identical in structure to the valve ring 40 and consists of a spider 55 having radially outwardly extending legs 56 for supporting the resilient valve ring 54. The valve ring 54 is positioned immediately adjacent the openings 35 and is arranged to control the flow of milk through the same.

Figure 2:
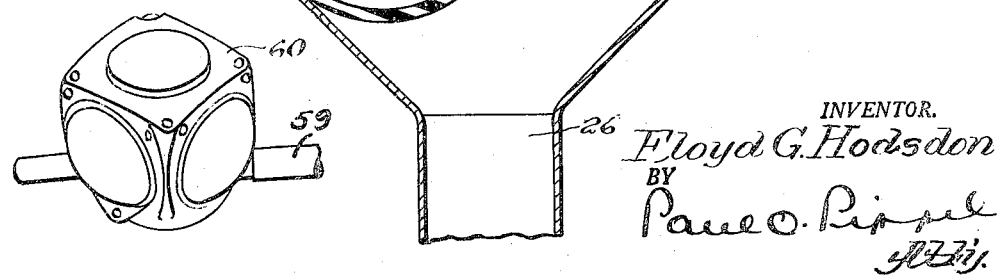
Fig. 2 is a perspective view of a pulsating mechanism.

A support 57 is rigidly positioned in the discharge chamber 23. The support 57 includes a bearing portion 58 in which the tubular member 52 is slidable. A flexible hose or conduit 59 is connected to the end of the tubular member 52, said conduit being connected, as best shown in Fig. 2, to a source of pulsating pressure such as a pulsating mechanism 60.

During the operation the milk receiving chamber 21, by virtue of its vacuum connection 24, is continuously under vacuum pressure. The conduit 25 may be connected to a milk pipe line (not shown) which in turn is connected to the conventional type of teat cups of a milker unit. Milk therefore flows into the receiving chamber 21 and builds up within the chamber to a liquid level below the top of the feed pipe 29. During the entrance of the milk into the receiving chamber 21 the milk control valve 40 is effective to seal the milk discharge openings 31, said control valve being flush up against the lower surface of the upper partition wall 19. The resilient valve element 43 is also up tight against the lower end of the tube 29 and therefore the chamber 21 is tightly sealed from the intermediate chamber 22. The valve 40 by virtue of the resilient spider construction 41 is tightly held up against the milk discharge openings 31 by means of the vacuum pressure within the chamber 21. Thus in effect the valve 40 is of a pressure responsive type.

When the valve 40 is in this position where the milk receiving chamber is sealed from the intermediate chamber, the diaphragm structure is in an expanded position and the valve stem 38 is in its maximum upper position. The pulsator at this particular moment is on its atmosphere stroke and the diaphragm structure is not subjected to vacuum suction. The speed of the pulsator 60 regulates the frequency of the movement of the valve mechanism 37. As the pulsator 60 performs its vacuum stroke, the inside of the diaphragm structure 46 is subjected to suction and the diaphragm 47 collapses. Just prior to the collapse of the diaphragm, the shoulder 52' of the guide member 52 is seated upon the bracket 58. The diaphragm structure is positioned away from the dished portion 32. As the diaphragm collapses, due to the suction stroke of the pulsator, the guide member 52 and the diaphragm housing 46 first moves upwardly and the shoulder 52' moves out of contact with the bracket 58. The valve 54 is thereupon also moved upwardly until it is in close proximity to the milk openings 35. When the diaphragm is approximately half collapsed the diaphragm housing touches the lower surface of the dished portion 32.

As the diaphragm structure engages the dished portion 32, the stem 38 is moved with considerable force downwardly and the valve 43 is pulled away from the lower opening of the tube 29. The movement of the stem 38 continues until the upper end of the tube 34 is closed against the entrance of air into chamber 22 from chamber 23. In this position of the stem 38, the valve 40 is still up against the openings 31. As the pressure between the chambers 21 and 22 is equalized, the spring fingers of the spider cause the valve 40 to snap away from the openings 31 thereby allowing milk to pass to the chamber 22.

Just prior to the entrance of milk into the chamber 22, the lower valve 54 has been pulled up against the milk openings 35 by the vacuum within the chamber. This is readily accomplished since, as previously mentioned, the valve 54 was closely positioned in proximity to the openings 35. The chambers 21 and 22 are now in communication with one another and the milk is in chamber 22. The pulsating mechanism 60 now performs its atmosphere stroke and vacuum is replaced with atmosphere within the conduit 59. As the vacuum is destroyed within the diaphragm chamber 51, the spring 53 is effective to push the diaphragm and the diaphragm cup 50 apart into an expanded position.

The valve 34' has been positioned in sealing relation with the tube 39. The expansion of the diaphragm moves the stem 38 upwardly whereupon the valve 34' is moved away from the upper opening of the tube 34. The valve 34' is thereupon moved to again close the tube 29. The movement of the stem 38 causes the valve 40 to be positioned in close proximity to the middle openings 31. As the air enters the tube 39 to the chamber 22, the pressure differential between chambers 21 and 22 causes the valve 40 to be moved upwardly in sealing relation with the openings 31.

The diaphragm structure now drops downwardly until the shoulder 52' rests on the guide member 58. The arms of the spider exert a downward pressure on the valve 40 and when the pressure between chambers 22 and 23 is equalized, the valve 40 snaps away from the openings 35 thereby permitting milk to pass to the discharge chamber 23.

It is readily apparent that the dimpled portion 36 is provided to permit air to enter around the edges of the diaphragm structure when it is in its uppermost position. After the milk enters the discharge chamber 23 it leaves through the conduit 26.

The operation thus described occurs during each atmospheric and vacuum stroke of the pulsating device 60. Thus a complete cycle of operation of the releaser takes place during one complete operation of the pulsator. A complete operation of the pulsator is one vacuum pulsation in the conduit 59 followed by exposure to atmospheric pressure. The speed of operation of the pulsator can be controlled by a well-known adjustment which is standard on conventional pulsators, and thus the cycle of operation of the releaser can be adjusted likewise. It can be seen that the discharge of milk from one chamber to another is efficiently and positively controlled by the pulsating mechanism. The valves 40 and 54 are resiliently constructed so that they will react to the slightest changes in pressure within the chambers and thus effectively control the flow of milk through the discharge openings. It can be seen therefore that a novel improved releaser mechanism has been provided and it is to be understood that changes and modifications may be made which do not depart from the spirit of the invention as disclosed nor the scope thereof as defined in the appended claims.

What is claimed is:

1. A milk releaser having a receiving chamber continually under vacuum pressure, an intermediate chamber alternately under vacuum and atmospheric pressure, and a discharge chamber under continuous atmospheric pressure, a first partition wall between the receiving and the intermediate chamber, said wall having a first milk discharge opening and a first air opening, a second partition wall between the intermediate and the discharge chambers, said second wall having a second milk discharge opening and a second air opening, a valve mechanism including an upper and lower valve member responsive to pressure within the chambers to control the discharge of liquid through said first and second milk openings, and means on said valve mechanism for alternately opening and closing said first and second air openings thereby alternately equalizing the pressures within the milk receiving and intermittent chambers, whereby said upper and lower valve members are actuated to discharge milk alternately from said receiving and intermittent chambers.

2. A milk releaser having a receiving chamber continually under vacuum pressure, an intermediate chamber alternately under vacuum and atmospheric pressure, and a discharge chamber under continuous atmospheric pressure, a first partition wall between the receiving and the intermediate chamber, said wall having a pressure responsive valve means arranged to control the flow of milk from said chamber, a first tube in communication with the receiving chamber and the intermediate chamber, said first tube extending upwardly into the receiving chamber, a second partition wall between the intermediate and the discharge chamber, said second wall having a second pressure responsive valve means arranged to control the flow of liquid from said intermediate chamber, a second tube in communication with the discharge and the intermediate chamber, said second tube extending upwardly into the intermediate chamber, and a valve structure arranged and constructed to intermittently open said first tube thereby equalizing the pressure between said receiving and intermediate chambers whereby said first valve structure is operable to discharge milk to the intermittent chamber, said valve structure also being arranged and constructed to intermittently open said second tube to the atmosphere and substantially simultaneously close said first tube, thereby equalizing the pressure between said intermediate and said discharge chambers whereby said second pressure responsive valve is opened to permit the flow of milk to said discharge chamber.

3. A milk releaser having a receiving chamber continually under vacuum pressure, an intermediate chamber alternately under vacuum and atmospheric pressure, and a discharge chamber continually under atmospheric pressure, a first partition wall between the receiving and the intermediate chamber, said wall having a first air conduit in communication with the receiving and intermediate chambers, said conduit having a portion extending within said receiving chamber, and a plurality of upper peripherally disposed milk discharge openings, a second partition wall between the intermediate and discharge chambers, said wall having a second conduit in communication with the discharge and intermediate chambers and having a portion extending within the intermediate chamber and a plurality of lower peripherally disposed milk discharge openings, a valve mechanism for controlling said milk discharge openings, including a vertically movable valve support having a valve element adapted to alternately open and close said first and second conduits, an upper resilient annular valve connected to said valve support for controlling said upper milk discharge openings, a lower resilient annular valve connected to said support for controlling said lower milk discharge openings, and means for vertically reciprocating said valve support thereby alternately closing and opening said first and second conduits, thereby equalizing the pressure within said chambers whereby said upper and lower resilient valves are actuated to permit discharge milk from one chamber to another.

4. A milk releaser according to claim 3 wherein the upper and lower annular resilient valve members are each connected to the movable valve support by means of a resilient spider shaped element.

5. A milk releaser having a receiving chamber under continuous vacuum, a discharge chamber continually under atmospheric pressure, an intermediate chamber intermittently under vacuum and atmospheric pressure, a first partition wall between the receiving and intermediate chambers, said first partition wall having a first air opening and a first milk discharge opening, a second partition wall between the intermediate and the discharge chamber, said second partition wall having a second air opening and a second milk discharge opening, a valve mechanism arranged to alternately seal said first air opening and the first milk discharge opening, said valve mechanism including a first milk control valve, a diaphragm structure secured to said valve mechanism for actuating the same, said diaphragm structure including a diaphragm chamber in communication with a source of pulsating air and vacuum pressure for intermittently moving the diaphragm structure, a second milk control valve connected to said valve mechanism and arranged to seal the second milk discharge openings, said valves being constructed and arranged to alternately seal said receiving and said intermediate chambers, whereby during one position of said valves liquid is discharged from said receiving chamber into said intermediate chamber and whereby during a second position of said valves, the receiving chamber is sealed, and the intermediate chamber is opened to permit discharge of liquid therefrom to said discharge chamber.

6. A milk releaser having a receiving chamber under continuous vacuum, a discharge continually under atmospheric pressure, an intermediate chamber intermittently under vacuum and atmospheric pressure, a first partition wall between the receiving and intermediate chambers, said first partition wall having a first air opening and a milk discharge opening, a first tube in communication with said first air opening and extending within said receiving chamber, a second partition wall between the intermediate and the discharge chamber, said second partition wall having a second air opening and a milk discharge opening, a second tube in communication with said second air opening, said tube extending within said intermediate chamber, a valve structure slidable in said second tube and arranged to alternately seal said first air opening and the upper end of said second tube, a first milk control valve connected to said valve structure for sealing the milk openings of said first partition wall, a diaphragm structure secured to the bottom of said valve structure, said diaphragm structure including a diaphragm chamber in communication with a source of pulsating air and vacuum pressure for intermittently collapsing the diaphragm structure, a second milk control valve connected to said diaphragm structure and arranged to seal the milk discharge opening in said second partition wall, said valves being constructed and arranged to alternately seal said receiving and said intermediate chambers, whereby during one position of said valves liquid is discharged from said receiving chamber into said intermediate chamber and whereby during a second position of said valves, the receiving chamber is sealed, and the intermediate chamber is opened to permit discharge of liquid therefrom to said discharge chamber.

7. A milk releaser having a receiving chamber under continuous vacuum, a discharge chamber continually under atmospheric pressure, an intermediate chamber intermittently under vacuum and atmospheric pressure, a first partition wall between the receiving and intermediate chambers, said first partition wall having a first air opening and a series of milk discharge openings, a first vertical tube in communication with said first air opening and extending within said receiving chamber, a second partition wall between the intermediate and the discharge chamber, said second partition wall having a second air opening and a series of milk discharge openings, a second vertical tube in communication with said second air opening, said tube extending within said intermediate chamber and being in substantially axial alignment with said first vertical tube, a valve guide slidable within said second vertical tube, a valve member carried at the upper end of said guide and arranged to alternately seal said first air opening and the upper end of said second vertical tube, a first annular valve connected to said valve guide for sealing the milk discharge openings of said first partition wall, a diaphragm structure secured to the bottom of said valve guide below said second partition wall, said diaphragm having a chamber in communication with a source of pulsating air and vacuum pressure for intermittently collapsing the diaphragm structure, spring means operable to expand the diaphragm structure, a second annular valve connected to said diaphragm structure below said second partition wall and arranged to seal the milk discharge openings therein, said valves being constructed and arranged to alternately seal said receiving and said intermediate chambers, whereby during one position of said valves liquid is discharged from said receiving chamber into said intermediate chamber and whereby during a second position of said valves, the receiving chamber is sealed, and the intermediate chamber is opened to permit discharge of liquid therefrom to said discharge chamber.

8. A milk releaser having a receiving chamber under continuous vacuum, a discharge chamber continually under atmospheric pressure, an intermediate chamber intermittently under vacuum and atmospheric pressure, a first partition wall between the receiving and intermediate chambers, said first partition wall having a first air opening and a series of peripherally arranged milk discharge openings, a first vertical tube in communication with said first air opening and extending upwardly within said receiving chamber, a second partition wall between the intermediate and the discharge chamber, said second partition wall having a second air opening and a series of peripherally arranged milk discharge openings, a second vertical tube in communication with said second central opening, said tube extending upwardly within said intermediate chamber, and having at its upper end a valve seat terminating below and in axial alignment with said first air opening, a valve guide slidable within said second vertical tube, a valve member carried at the upper end of said guide and arranged to alternately seal said first air opening and the upper end of said second vertical tube, a first annular peripheral valve connected to said valve guide for sealing the peripheral milk discharge openings of said first partition wall, a diaphragm structure secured to the bottom of said valve guide below said second partition wall, a support in the discharge chamber, a tubular member slidable in said support, said diaphragm also being secured to said tubular member, said tubular member being in communication with the interior of the diaphragm structure and with a source of pulsating air and vacuum pressure for collapsing the diaphragm structure, spring means acting between the tubular member and the valve guide for expanding the diaphragm structure, a second annular peripheral valve connected to said tubular member below said second partition wall and arranged to seal the peripheral milk discharge openings therein, said valves being constructed and arranged to alternately seal said receiving and said intermediate chambers, whereby during one position of said valves liquid is discharged from said receiving chamber into said intermediate chamber and whereby during a second position of said valves, the receiving chamber is sealed, and the intermediate chamber is opened to permit discharge of liquid therefrom to said discharge chamber.

9. A milk releaser having a receiving chamber under continuous vacuum, a discharge chamber continually under atmospheric pressure, an intermediate chamber intermittently under vacuum and atmospheric pressure, a first partition wall between the receiving and intermediate chambers, said first partition wall having a first central opening and a series of peripherally arranged openings, a first vertical tube in communication with said first central opening and extending upwardly within said receiving chamber, a second partition wall between the intermediate and the discharge chamber, said second partition wall having a second central opening and a series of peripherally arranged openings, a second vertical tube in communication with said second central opening, said tube extending upwardly within said intermediate chamber and having at its upper end a valve seat terminating below and in axial alignment with said first central opening, a valve guide slidable within said second vertical tube, a valve member carried at the upper end of said guide and arranged to alternately seal said first central opening and the upper end of said second vertical tube, a first annular peripheral valve connected to said valve guide for sealing the peripheral openings of said first partition wall, a diaphragm structure secured to the bottom of said valve guide below said second partition wall, a support in the discharge chamber, a tubular member slidable in said support, said diaphragm also being secured to said tubular member being in communication with the interior of the diaphragm and with a source of pulsating air and vacuum pressure for intermittently collapsing the diaphragm structure, spring means acting between the tubular member and the valve guide for expanding the diaphragm structure, a second annular peripheral valve connected to said tubular member below said second partition wall and arranged to seal the peripheral openings therein, said valves being constructed and arranged to alternately seal said receiving and said intermediate chambers, whereby during one position of said valves liquid is discharged from said receiving chamber into said intermediate chamber and whereby during a second position of said valves, the receiving chamber is sealed, and the intermediate chamber is opened to permit discharge of liquid therefrom to said discharge chamber.

10. A milk releaser having a first chamber continually under vacuum pressure, a second chamber alternately under vacuum and atmospheric pressure, a first wall separating the first chamber and the second chamber, said first wall having a first milk discharge opening and a first air opening, a second wall enclosing said second chamber, said second wall having a second milk discharge opening and a second air opening, a valve mechanism connected to the second wall, said mechanism including a reciprocating member, a first pressure responsive valve and a second pressure responsive valve respectively connected for engagement with the first and second milk discharge openings, said pressure responsive valves being responsive to pressure within the chambers for controlling the discharge of milk through said first and second milk openings, valve members connected to the reciprocating member, and means arranged and constructed to move said reciprocating member whereby the valve members alternately open and close the first and second air openings, thereby alternately equalizing the pressures within the first and second chambers, whereby said first and second pressure responsive valves are actuated to alternately discharge milk from said first and second chambers.

11. A milk releaser having a first chamber continually under vacuum pressure, a second chamber alternately under vacuum and atmospheric pressure, a first wall separating the first chamber and the second chamber, said first wall having a first milk discharge opening and a first air opening, a second wall enclosing said second chamber, said second wall having a second milk discharge opening and a second air opening, a valve mechanism connected to the second wall, said mechanism including a reciprocating member, a first pressure responsive valve and a second pressure responsive valve respectively connected for engagement with the first and second milk discharge openings, said pressure responsive valves being responsive to pressure within the chambers for controlling the discharge of milk through said first and second milk openings, valve members connected to the reciprocating member, diaphragm means arranged and constructed to move said reciprocating member whereby the valve members alternately open and close the first and second air openings, and a pulsating mechanism connected to said diaphragm for actuating the same.

12. A milk releaser according to claim 10 wherein the pressure responsive valves include resilient means connecting the pressure responsive valves to the reciprocating member.

13. A milk releaser according to claim 10 wherein the reciprocating member is arranged to reciprocate within the second chamber and includes diaphragm means for moving the reciprocating member.

FLOYD G. HODSDON.

REFERENCES CITED

The following references are of record in the file of this patent:

UNITED STATES PATENTS

| Number | Name | Date |
|---|---|---|
| 1,247,329 | Ridd | Nov. 20, 1917 |
| 1,562,770 | Jamieson | Nov. 24, 1925 |

FOREIGN PATENTS

| Number | Country | Date |
|---|---|---|
| 438,703 | Great Britain | Nov. 21, 1935 |
| 104,966 | Australia | Aug. 25, 1938 |